July 7, 1959     R. A. BRAUBURGER     2,893,087
FASTENING DEVICE
Filed Oct. 18, 1956
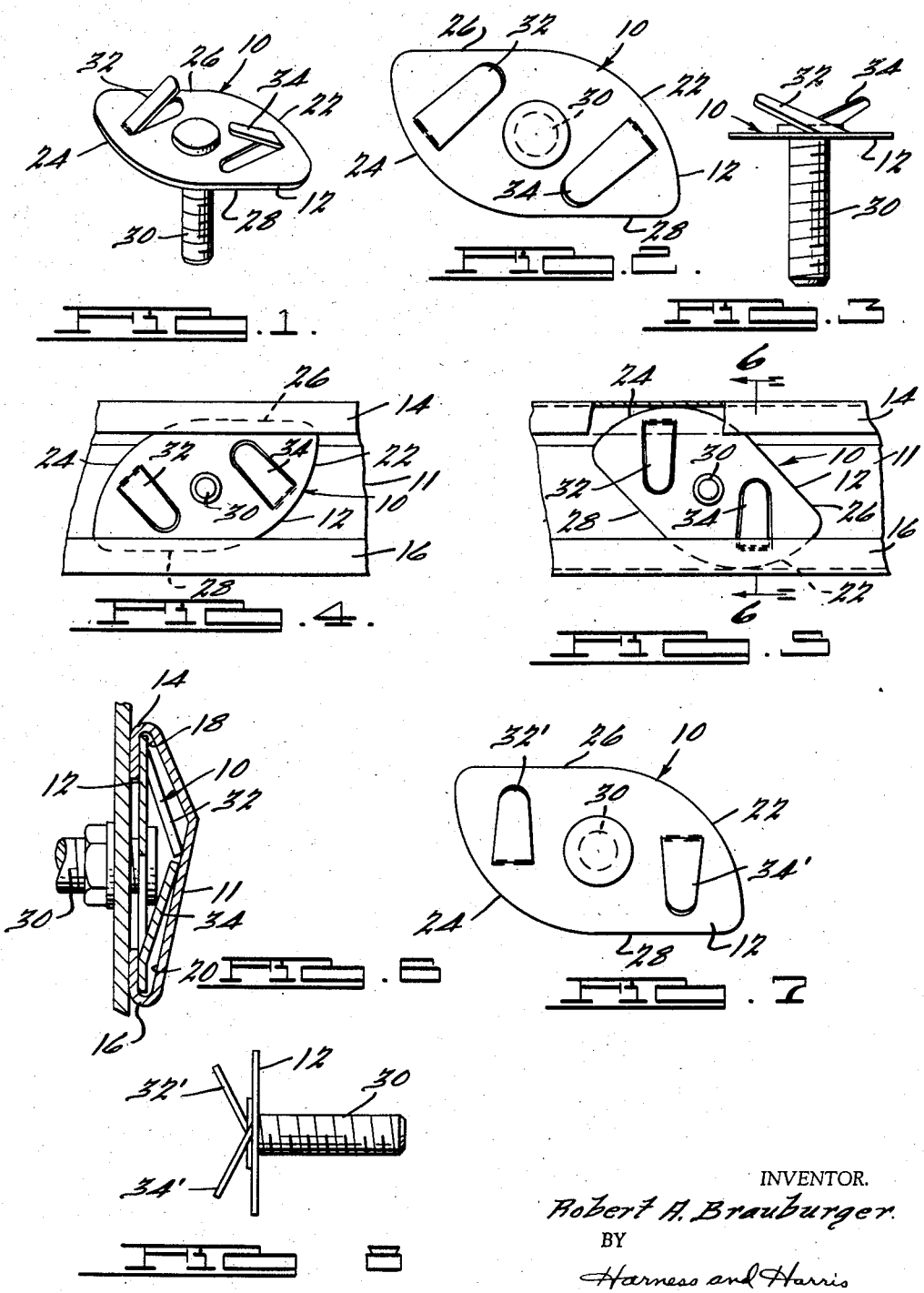
INVENTOR.
Robert A. Brauburger.
BY
Harness and Harris
ATTORNEYS.

United States Patent Office 2,893,087
Patented July 7, 1959

2,893,087

FASTENING DEVICE

Robert A. Brauburger, Birmingham, Mich., assignor to Chrysler Corporation, Highland Park, Mich., a corporation of Delaware Application October 18, 1956, Serial No. 616,716

2 Claims. (Cl. 24—73)

This invention relates to a fastening device particularly adapted for attaching a molding to a support.

In automobiles and other commercial devices trim molding is customarily secured to surface portions of the automobile by fastening devices having a cross plate which spans the distance between inturned flanges provided along the side edges of the molding. The fastening device usually includes a threaded bolt which depends from the cross plate and is provided for insertion in an opening in the surface of the automobile or the like. A cooperating threaded element, such as a nut, provides the final securing means. Frequently the moldings are of varying width, commonly being tapered, and it is advantageous to provide a fastening device that may be received at various places in a molding of varying width or that may be received in different moldings of uniform but different widths. The cross plate is frequently provided with an eccentric contour so that tightening of the nut tightens the cross plate in the molding and the eccentricity of the cross plate permits its reception in moldings of different widths.

It is a principal object of this invention to provide a fastening device of economical construction in which a cross plate is secured to one end of a threaded bolt and two or more tongues are struck from the metal of the cross plate so that they project upwardly from the cross plate in opposite directions. The tongues resist rotation of the fastening device out of its seated position in the molding. The tongues resist rotation of the fastening device from its installed position although they do not materially resist tightening of the cross plate in the molding as an incident to tightening of the cooperating threaded element or nut on the bolt.

It is common practice in the assembly of automobiles to provide a bench worker with a fixture to guide the insertion of clips in the molding at spaced intervals matching the holes provided in the surface of the automobile and it is the duty of the tongues provided herein to assure that the moldings will remain in the assembled spaced positions until the entire molding and clip assembly is mounted on the automobile surface. Thus the tongues serve their principal use in the short period of time existing between insertion of the fastening devices in the molding on a bench and transportation of the molding to the automobile upon which it is to be assembled.

In the drawings:

Fig. 1 is a perspective view of the fastening device;

Fig. 2 is a top plan view thereof;

Fig. 3 is an end elevational view;

Fig. 4 is a plan view of the fastening device inserted in a molding strip as viewed from the rear of the molding strip;

Fig. 5 is a view similar to Fig. 4 but showing the fastening device rotated in the molding strip to its assembled position therein;

Fig. 6 is a sectional view taken on the lines 6—6 of Fig. 5;

Fig. 7 is a plan view of a modified form of fastening device; and

Fig. 8 is an end elevational view of the device shown in Fig. 7.

A fastening device 10 is adapted for assembly with a strip of molding 11 having inturned flanges 14 and 16 along its side edges. The flanges 14 and 16 of the molding define opposing recesses 18 and 20.

The fastener 10 comprises a cross plate 12 which is preferably flat and provided with an eccentric periphery. The eccentric periphery is illustrated as having substantially similar eccentric arcuate end portions 22 and 24 which progress outwardly in the same direction of hand from root to terminal tip portions and side edges 26 and 28 which join the arcuate end portions root to tip. The cross plate has one dimension which is sufficiently narrow as to accommodate insertion of the cross plate into the interior of the molding strip 11 as illustrated in Fig. 4. It also has a dimension and major axis sufficient to accommodate spanning the interior of the molding strip so that the cross plate abuts and firmly engages the interior of the flanges 14 and 16. The cross plate is elongated and its diagonally opposed rounded corners 22 and 24 accommodate its rotation into position in moldings of various widths.

The fastening device also includes a bolt or shank 30 which is substantially centrally disposed relative to one side of the cross plate 12. It is intended that the bolt 30 be inserted through an opening on the surface of an automobile or the like and that a cooperating nut be applied thereto.

The fastening device cross plate 12 is further provided with a plurality of tabs or tongues two of which are illustrated and designated by the numerals 32 and 34. The tongues are equally spaced on opposite sides of the bolt or shank and integrally formed from the cross plate material. The tongues are preferably of similar length although one tongue could be shorter than the other if dictated by some peculiar configuration of the molding. The tongues 32 and 34 project upwardly from the cross plate 12 on the side of the cross plate opposite to the side from which the bolt or shank 30 depends. The tongues preferably project upwardly at acute angles in opposite directions so that they point at and contact the inner surface of the molding 11 in a direction to oppose rotation of the fastening device backwards from its Fig. 5 position to its Fig. 4 position. The tongues are also positioned to slant athwart the major axis of cross plate 12.

Figs. 7 and 8 illustrate a modified form of the fastening device which resembles the Fig. 1 through Fig. 6 form in all respects except that the tongues 32' and 34' of the Figs. 7 and 8 device are struck from the cross plate at a different angular relationship thereto. In the Figs. 7 and 8 form the tongues 32' and 34' have their roots substantially aligned with the side edges 26 and 28 of the cross plate while they are inclined relative thereto in the Figs. 1 through 6 form of the device.

I claim:

1. A fastening device for assembly with a strip of molding having inturned flanges along the side edges thereof forming opposing recesses, said device comprising an elongated cross plate having a major axis and adapted to span the distance between the inturned edges of said molding, said cross plate having a periphery of eccentric contour to accommodate its reception by rotation in a first direction in the opposing recesses of moldings having different widths, a support engaging shank substantially centrally disposed relative to and depending from one side of said cross plate, said shank being threaded so that rotation of a cooperating threaded element in said first direction on said shank will effect a fastening of said device to a support and urge said cross plate into tight engagement with said inturned flanges, and locking means adapted to resist rotation of said device in a direction relative to said molding opposite to said first direction, said locking means comprising a pair of parallel tabs stamped from portions of said cross plate located within the confines of the above described periphery, said tabs being further located on opposite sides of said shank in laterally offset relation thereto and slanting athwart the above mentioned major axis of said cross plate, each of said tabs having a substantially flat side surface and terminating in a sharp edge wholly contained within the plane of its side surface, each of said tabs extending upwardly at an acute angle from the side of said cross plate opposite said shank with the sharp terminal edges of said tabs defining the extremity of said device remote from said shank, the inclinations of said tabs relative to said cross plate being in directions to point at and contact the inner surface of said molding in directions to offer little resistance to rotation of said device in said first direction relative to said molding and to resist rotation of said device in said second direction relative to said molding by reason of said sharp edges biting into said molding and tending to apply compressive forces to said tabs, said tabs thus being effective to temporarily retain said fastening device in assembled relationship with said molding prior to assembly of the molding and fastening device with the aforementioned cooperating threaded element.

2. A fastening device for assembly with a strip of molding having inturned flanges along the side edges thereof forming opposing recesses, said device comprising a support engaging shank having a threaded portion, an elongated cross plate having a major axis and secured to one end of said shank in a plane substantially normal to the axis of said shank, said cross plate being adapted to span the distance between the inturned edges of said molding, said cross plate having substantially similar eccentric arcuate end portions progressing outwardly in the same direction of hand from root to terminal tip portions and adapted to enter the opposed recesses, said cross plate having side edges joining said arcuate end portions root to tip, and locking means adapted to resist rotation of said device in a direction relative to said molding opposite to said first direction, said locking means comprising a pair of parallel tongues carried by said cross plate on opposite sides of said shank in laterally offset relation thereto and slanting athwart the above mentioned major axis of said cross plate, each of said tongues extending upwardly at an acute angle from the side of said cross plate opposite said shank and terminating in a sharp edge which is the furthermost portion of said tongue from said plate and is adapted to abut an inner surface of said molding, each of said tongues being located wholly within the confines of a projection parallel to the axis of said shank of the above described cross plate periphery, the inclinations of said tongues relative to said cross plate being in opposite directions and adapted to offer little resistance to rotation of said device in said first direction relative to said molding and to resist rotation of said device in said second direction relative to said molding by reason of said edges biting into said molding and tending to apply compressive forces to said tongues.

References Cited in the file of this patent
UNITED STATES PATENTS

| | | |
|---|---|---|
| 2,473,400 | Waara | June 14, 1949 |
| 2,531,352 | Churchill | Nov. 21, 1950 |